United States Patent [19]
Hata et al.

[11] Patent Number: 4,495,312
[45] Date of Patent: Jan. 22, 1985

[54] RESIN COMPOSITION SUITABLE FOR USE IN MEDICAL DEVICES

[75] Inventors: Hiroyoshi Hata, Shiga; Seiichirou Honda, Takarazuka; Seiya Hosokawa, Ibaraki; Kazuhiko Kanki, Uji; Toshiharu Matsumiya; Kazuo Sakamoto, both of Shinnanyo, all of Japan

[73] Assignee: Sekisui Kagaku Kogyo Kabushiki Kaisha, Osaka, Japan

[21] Appl. No.: 474,349

[22] Filed: Mar. 11, 1983

[30] Foreign Application Priority Data

Mar. 16, 1982 [JP] Japan .................................. 57-41889
Jun. 1, 1982 [JP] Japan .................................. 57-94582
Oct. 18, 1982 [JP] Japan .................................. 57-183501

[51] Int. Cl.³ ............................................. C08K 5/15
[52] U.S. Cl. ................................. 523/105; 524/109; 524/114; 528/499
[58] Field of Search ................ 523/105; 524/109, 114; 528/499

[56] References Cited

U.S. PATENT DOCUMENTS

| | | | |
|---|---|---|---|
| 3,047,415 | 7/1962 | Rhodes et al. | 524/109 |
| 3,055,778 | 9/1962 | Rhodes | 524/109 |
| 3,231,529 | 1/1966 | Kuhn et al. | 524/114 |
| 3,283,936 | 11/1966 | Kehe et al. | 524/109 |
| 3,501,427 | 3/1970 | Edenbaum | 524/114 |
| 3,780,140 | 12/1973 | Hammer | 260/884 |
| 3,943,070 | 6/1960 | Hecker et al. | 524/114 |
| 3,948,832 | 4/1976 | Hudgin | 524/114 |

FOREIGN PATENT DOCUMENTS

| | | | |
|---|---|---|---|
| 589227 | 12/1959 | Canada | 524/109 |
| 56-041240 | 4/1981 | Japan . | |
| 56-136833 | 10/1981 | Japan | 524/114 |
| 57-177042 | 10/1982 | Japan | 523/105 |
| 815301 | 6/1959 | United Kingdom | 524/109 |
| 1403773 | 8/1975 | United Kingdom . | |

Primary Examiner—Joseph L. Schofer
Assistant Examiner—N Sarofim
Attorney, Agent, or Firm—Wenderoth, Lind & Ponack

[57] ABSTRACT

A resin composition comprising
(a) a vinyl chloride/ethylene copolymer having an ethylene content in the range of 3 to 12% by weight, an average degree of polymerization in the range of 700 to 2900 and a ratio of weight average molecular weight to number average molecular weight in the range of from 2.5:1 to 5.5:1,
(b) an ethylene/carbon monoxide/vinyl acetate copolymer, and
(c) a glycerin ester of a specific epoxidized aliphatic carboxylic acid. This resin composition is suitable for making medical devices, especially bags for storing transfusion fluids, receptacles for storing blood, and tubes for a blood circuit in artificial kidneys.

14 Claims, No Drawings

RESIN COMPOSITION SUITABLE FOR USE IN MEDICAL DEVICES

This invention relates to a resin composition comprising a vinyl chloride-type polymer as a base, which is suitable for making medical devices, especially bags for storing transfusion fluids, receptacles for storing blood, and tubes for a blood circuit in artificial kidneys.

Heretofore, blood bags have been used to transport or store blood, and in performing dialysis by artificial kidneys on patients with renal disorders, blood circuit tubes have been used. These medical devices are required to be pliable and free from degeneration, and even upon long contact with blood, not to degenerate blood or permit migration of foreign materials into the blood. The blood circuit tubes should also possess transparency which enables the blood passing inside to be observed from outside, pliability which permits free deformation, repulsive elasticity which enables the tube to regain its original shape rapidly when the tube is clamped from outside or released from clamping and enables this operation to stop or pass the blood stream as desired, and surface non-tackiness which prevents the tube from adhering to itself when the tube is wound or laminated.

A flexible vinyl chloride resin composition prepared by adding a large amount of a plasticizer such as di-2-ethylhexyl phthalate to a vinyl chloride resin has been used as a material for these medical devices such as blood bags or blood circuit tubes. This resin composition has excellent pliability and transparency, but has the defect that a small amount of the plasticizer dissolves and is absorbed and accumulated in the body through the blood stream. The blood bags or blood circuit tubes are sterilized by contact with ethylene oxide gas, or by exposure to pressurized steam in an autoclave. In the case of the former, this composition may absorb ethylene oxide. In the case of the latter, it is difficult to completely avoid the defect that blocking occurs in a molded article from the resin composition or adhesion occurs at the contacting surface between the molded article and an instrument, transparency is lost, or deformation is likely to occur.

It was desired therefore to provide a resin composition for making a blood bag or a blood circuit tube which is free from these defects.

The present inventors noted that the aforesaid vinyl chloride resin containing di-2-ethylhexyl phthalate, in spite of its some defects, has actually been used, and found to be acceptable in accordance with test standards stipulated in Japanese Pharmacopoeia and Notifications of the Ministry of Health and Welfare, Japan; TSS/B/320008 (Specification for a Plastic Collapsible Container for Blood and Blood Components) in Britain; DIN, 58368 Blatt, 2 in Germany; U.S. Pharmacopoeia XIX, 644 (1975) in U.S.A.; and Swiss Pharmacopoeia Subsidia Pharmaceutica, II, 5 (1961). They attempted to remove the aforesaid defects by improving the vinyl chloride resin and providing a vinyl chloride resin composition not containing di-2-ethylhexyl phthalate.

A method for providing a flexible formulation of a vinyl chloride resin without substantially using a plasticizer was reported which comprises blending the vinyl chloride resin with a terpolymer of ethylene, carbon monoxide and vinyl acetate (see U.S. Pat. No. 3,780,140 or British Pat. No. 1,403,773). The present inventors, therefore, actually mixed a vinyl chloride resin with this terpolymer to form a uniform composition and examined its properties. Consequently, they knew that this composition had satisfactory transparency and pliability, but showed undesirable results in a test for hemolysis or a test for cytotoxin. The present inventors investigated the cause of this, and found that the ethylene/carbon monoxide/vinyl acetate copolymer contains acetic acid resulting from the decomposition of this copolymer, and when a medical device is molded by using a resin composition containing this copolymer, the resulting medical device becomes hemolytic and cytotoxic.

Previously, the present inventors, based on this finding, proposed a resin composition for medical devices, comprising a vinyl chloride resin, an ethylene/carbon monoxide/vinyl acetate copolymer and calcium oxide or magnesium oxide as an acetic acid scavenger (see Japanese Laid-Open Patent Publication No. 41240/1981). It was found however that although acetic acid can be scavenged by a fine powder of calcium oxide or magnesium oxide in the composition if the amount of acetic acid is very small, a large amount of acetic acid cannot be completely scavenged by the fine powder of calcium oxide or magnesium oxide, and a molded article prepared form the composition inevitably becomes hemolytic and cytotoxic. If the amount of the fine powder of calcium oxide or magnesium oxide is increased to scavenge acetic acid, a molded article prepared from the resulting composition has reduced transparency and an increased ignition loss, and is likely to fall outside the range of standards set for medical devices.

On further investigations, the present inventors have now found that by including a glycerin ester having a specified chemical structure into a mixture of a vinyl chloride resin and an ethylene/carbon monoxide/vinyl acetate copolymer, there can be obtained a resin composition being free from the aforesaid defect of hemolysis and cytotoxin and having excellent pliability and transparency, and that by using a vinyl chloride/ethylene copolymer having a specified ethylene content, degree of polymerization and molecular weight distribution as the vinyl chloride resin, there can be provided a resin composition which can be melt-molded at relatively low temperatures, does not cause the aforesaid defects during sterilization by pressurized steam in an autoclave, and shows a further improvement in transparency, mechanical properties, hemolysis and cytotoxin.

Thus, according to this invention, there is provided a resin composition comprising (a) a vinyl chloride/ethylene copolymer having an ethylene content in the range of 3 to 12% by weight, an average degree of polymerization in the range of 700 to 2900 and a ratio of weight average molecular weight to number average molecular weight in the range of from 2.5:1 to 5.5:1, (b) an ethylene/carbon monoxide/vinyl acetate copolymer, and (c) a glycerin ester of the following formula

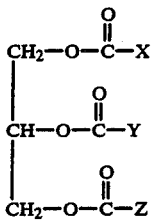

wherein X, Y and Z are identical and different and each represents a hydrogen atom or a residue of an epoxidized aliphatic carboxylic acid selected from the class consisting of

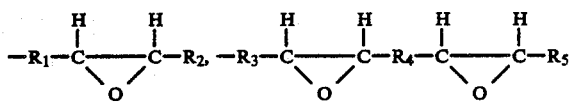

and

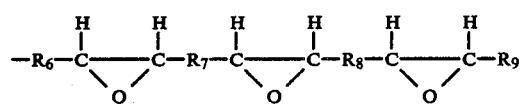

in which $R_1$, $R_3$, $R_4$, $R_6$, $R_7$ and $R_8$, independently from each other, represent a saturated or unsaturated, linear or branched divalent hydrocarbon group having 1 to 25 carbon atoms, and $R_2$, $R_5$ and $R_9$, independently from each other, represent a saturated or unsaturated, linear or branched monovalent hydrocarbon group having 1 to 25 carbon atoms, provided that X, Y and Z are not hydrogen atoms at the same time.

The novel and improved resin composition provided by this invention will be described below in greater detail.

One characteristic feature of the resin composition of this invention is that it contains a vinyl chloride/ethylene copolymer having an ethylene content of 3 to 12%, preferably 4 to 11%, more preferably 5 to 10%, based on the weight of the copolymer as the vinyl chloride resin component. If the ethylene content of the vinyl chloride/ethylene copolymer is less than 3%, it does not uniformly dissolve mutually in the ethylene/carbon monoxide/vinyl chloride copolymer. If it exceeds 12%, the characteristics of the copolymer as the vinyl chloride resin are reduced, and the resulting resin composition tends to have reduced mechanical strength and transparency. The vinyl chloride/ethylene copolymer can be composed only of two monomers, vinyl chloride and ethylene. As required, however, it may contain a copolymerizable third monomer, for example an α-olefin such as propylene, a vinyl ester such as vinyl acetate, a vinyl ether such as methyl vinyl ether, a vinyl halide such as vinyl bromide, an unsaturated acid such as maleic acid and fumaric acid, an ester of the unsaturated acid, styrene, acrylonitrile, or vinylidene chloride, in an amount which does not substantially affect the properties of the copolymer adversely. The amount of the third monomer is usually up to 20%, preferably up to 10%.

If the degree of polymerization of the vinyl chloride/ethylene copolymer is too low, the mechanical durability, such as creep, of the resin composition is reduced or the resin composition develops surface stickiness, although this depends upon the amount of the copolymer blended. In addition, its heat resistance is reduced, and there is a likelihood of formation of a heat decomposition product, which may be toxic on the living body, during melt molding. On the other hand, if the degree of polymerization is too high, uniform mixing with the ethylene/carbon monoxide vinyl acetata copolymer described hereinbelow tends to be difficult. It is important that the vinyl chloride/ethylene copolymer should have an average degree of polymerization in the range of 700 to 2900, preferably 900 to 2800, more preferably 1000 to 2500.

Furthermore, in order to provide a resin composition which is industrially quite satisfactory as a material for medical devices, it has been found important that the ratio of the weight average molecular weight $\overline{M}w$ to the number average molecular weight $\overline{M}n$, which has closely to do with the molecular weight distribution of the copolymer, should be within the range of from 2.5:1 to 5.5:1, preferably from 2.4:1 to 5.3:1, more preferably from 2.3:1 to 5.2:1. If the above ratio becomes lower outside the above range, the compatibility of the vinyl chloride/ethylene copolymer with the ethylene/carbon monoxide/vinyl acetate copolymer becomes poor, and the resulting resin composition has reduced transparency. If, on the other hand, the ratio exceeds the upper limit specified above, the occurrence of fish eyes in the resin composition generally increases.

The vinyl chloride/ethylene copolymer having the aforesaid specified ethylene content, degree of polymerization and molecular weight distribution can be produced by suspension polymerization or emulsion polymerization in the presence of ordinary radical polymerization catalysts. One specific method of polymerization is as follows: An autoclave equipped with a stirrer is charged with water and a dispersing agent, and then oxygen present inside the autoclave is removed by evacuation. With stirring, vinyl chloride and ethylene are introduced into the autoclave. At an elevated pressure, a polymerization initiator is added, and with continued stirring, the temperature of the contents of the autoclave is raised to 20° to 70° C. While the reaction mixture is stirred at this temperature for 5 to 15 hours, polymerization proceeds.

Examples of useful dispersing agents are partially saponified polyvinyl alcohols, cellulose derivatives such as methyl cellulose, hydroxymethyl cellulose and carboxy methyl cellulose, and surface-active agents such as polyvinyl pyrrolidone. The dispersing agent is used in an amount of usually 0.05 to 1.0% by weight based on the total weight of vinyl chloride and ethylene.

The kind of the polymerization initiator differs depending upon whether the polymerization is carried out in suspension or in emulsion. In order to perform suspension polymerization, there may be used peroxide compounds such as diisobutyryl peroxide, di-2-methylpentanoyl peroxide, 3,5,5-trimethylhexanoyl peroxide, lauroyl peroxide, and benzoyl peroxide, perester compounds such as cumyl peroxyneodecanoate, and peroxydicarbonate compounds such as diisopropyl peroxydicarbonate, dicetyl peroxydicarbonate, di-2-ethylhexyl peroxycarbonate and diisobutyl peroxydicarbonate. In order to perform emulsion polymerization, ammonium persulfate, potassium persulfate, etc. are used. The amount of the polymerization initiator used is generally 0.02 to 0.3% by weight based on the total weight of vinyl chloride and ethylene.

The starting vinyl chloride and ethylene are added to the reaction system in an amount exceeding the amount of the resulting polymer by 5 to 50% by weight. The ratio of the total weight of vinyl chloride and ethylene used at the time of polymerization to water used at the time of polymerization is selected from the range of from 1:1.2 to 1:3.

The end point of the polymerization can be empirically presumed from the relation between the internal pressure of the polymerization vessel and the yield of the polymer, which is obtained by preliminary experiments. After the polymerization, the unreacted monomers are removed, and the suspension or emulsion in the autoclave is filtered to remove water and to obtain polymer particles. The polymer particles are then washed with water and dried.

At least some of the ethylene/carbon monoxide/vinyl acetate copolymers used together with the vinyl chloride/ethylene copolymer in accordance with this invention are already known (see, for example, U.S. Pat. No. 3,780,140), and can be produced by methods known per se. For example, such a copolymer is available commercially under the trademark "ELVALOY 741 ®" from E. I. du Pont de Nemours & Co., U.S.A.

The monomer ratio in the ethylene/carbon monoxide/vinyl acetate copolymer is not strictly restricted, and can be varied according to the properties required of the copolymer. Generally, suitable copolymers are those obtained by copolymerizing 1 part by weight of ethylene, 0.03 to 0.5 part by weight, preferably 0.06 to 0.4 part by weight, more preferably 0.09 to 0.3 part by weight, of carbon monoxide, and 0.1 to 0.9 part by weight, preferably 0.2 to 0.8 part by weight, more preferably 0.3 to 0.7 part by weight, of vinyl acetate in the presence of a radical polymerization catalyst by a method known per se. The molecular weight of the ethylene/carbon monoxide/vinyl acetate copolymer is not critical, and can be varied depending upon the kind of the vinyl chloride/ethylene copolymer used. It is advantageous, however, that this copolymer has a weight average molecular weight of generally about 100,000 to about 2,000,000, preferably about 150,000 to about 1,000,000.

Another characteristic feature of the present invention is that a specified glycerin ester of the following formula

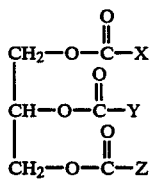

(I)

wherein X, Y and Z are as defined above, is combined with the aforesaid vinyl chloride/ethylene copolymer and ethylene/carbon monoxide/vinyl acetate copolymer.

It has been found that the use of this specified glycerin ester leads to a marked improvement in the hemolytic and cytotoxic properties of the resin composition without imparting its transparency and pliability.

The residue of an epoxidized aliphatic carboxylic acid represented by X, Y and Z is selected from the following groups

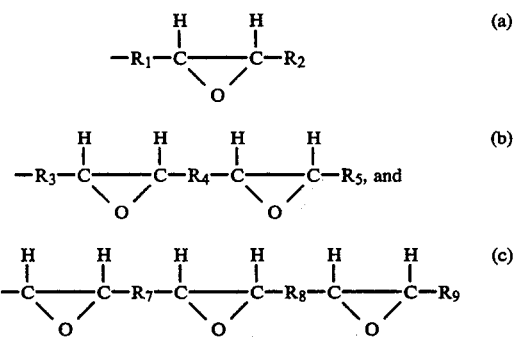

wherein $R_1$, $R_3$, $R_4$, $R_6$, $R_7$ and $R_8$, independently from each other, represent a saturated or unsaturated, linear or branched divalent hydrocarbon group having 1 to 25 carbon atoms, and $R_2$, $R_5$ and $R_9$, independently from each other, represent a saturated or unsaturated, linear or branched monovalent hydrocarbon group having 1 to 25 carbon atoms.

Examples of the saturated or unsaturated linear or branched divalent hydrocarbon group having 1 to 25 carbon atoms include alkylene groups such as methylene, ethylene, propylene, isopropylene, butylene, pentylene, hexylene, heptylene, nonylene and decylene, and alkenylene groups such as butenylene, pentenylene, hexenylene, heptenylene, nonenylene and decenylene. Preferred are saturated aliphatic hydrocarbon groups having 1 to 19 carbon atoms.

Examples of the saturated or unsaturated linear or branched monovalent hydrocarbon group having 1 to 25 carbon atoms include alkyl groups such as methyl, ethyl, propyl, butyl, pentyl, hexyl, heptyl, nonyl, and decyl, and alkenyl groups such as vinyl, allyl, butenyl, pentenyl, hexenyl, heptenyl, octenyl, nonenyl and decenyl. Saturated aliphatic hydrocarbon groups having 1 to 18 carbon atoms are preferred.

The carboxylic acid residues of formulae (a), (b) and (c) are derived from epoxidized aliphatic carboxylic acids which can be produced by epoxidizing the double bonds of unsaturated aliphatic carboxylic acids of the following formulae

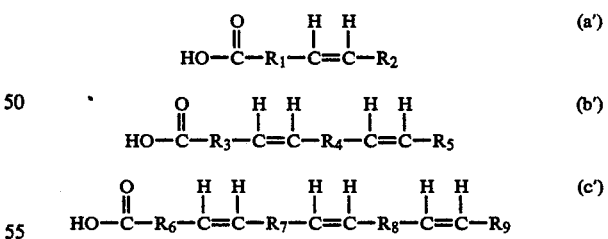

wherein $R_1$, $R_2$, $R_3$, $R_4$, $R_5$, $R_6$, $R_7$, $R_8$ and $R_9$ are as defined hereinabove. The above residues may contain generally 4 to 40 carbon atoms, preferably 5 to 30 carbon atoms, in total.

Examples of the unsaturated aliphatic carboxylic acid of formula (a') are 3-hexenoic acid, 4-hexenoic acid, 4-decenoic acid, 9-undecenoic acid, 4-dodecenoic acid, 5-dodecenoic acid, 9-octadecenoic acid and 13-docosenoic acid. Examples of the unsaturated aliphatic carboxylic acid of formula (b') are 9,12-hexadecadienic acid, 9,12-octadecadienic acid, eicosadienic acid, docosadienic acid and hexacodienic acid.

Examples of the unsaturated aliphatic carboxylic acid of formula (c') are hexadecatrienoic acid, 9,12,15-octadecatrienoic acid, 6,9,12-octadecatrienoic acid, eicosatrienoic acid and docosatrienoic acid.

The glycerin ester of formula (I) can be easily produced by esterifying glycerin with at least one of the unsaturated aliphatic carboxylic acids of formulae (a'), (b') and (c') and then oxidizing the esterification product. The glycerin ester may be a monoester or a diester, but is preferably a triester.

Glycerin esters preferably used in this invention are a triglyceride resulting from the esterification of glycerin with 9-octadecenoic acid, 9,12-octadecadienic acid and 9,12,15-octadecatrienoic acid; a triglyceride obtained by esterification of glycerin with 9-octadecenoic acid and 9,12,15-octadecatrienoic acid; and triglyceride obtained by esterification of glycerin with 9-octadecenoic acid and 9,12,15-octadecatrienoic acid. They may be used as a mixture of two or more.

Generally, the glycerin esters described above desirably contain 5 to 10% by weight, preferably 6 to 9.5% by weight, based on the weight of the ester, of oxirane oxygen. Desirably, they have an iodine value, as a measure of the degree of saturation, of generally not more than 10, preferably not more than 8, more preferably not more than 5.

The oxirane oxygen content is the weight percent of oxygen in

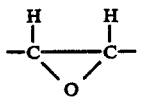

which is present in one mole of the glycerin ester. If the oxirane oxygen content is less than 5% by weight, the resulting composition tends to show only an insufficient improvement in hemolytic and cytotoxic properties. If it exceeds 10% by weight, the ester in the composition dissolves in the blood or transfusion fluids, and the resulting resin composition loses its suitability for medical devices. On the other hand, the iodine value is the grams of iodine absorbed per 100 g of the glycerin ester. If it is larger than 10, the glycerin ester tends to change with time.

The resin composition of this invention obtained by blending the specified vinyl chloride/ethylene copolymer, the ethylene/carbon monoxide/vinyl acetate copolymer and the glycerin ester represented by the above-specified chemical formula has excellent transparency and pliability and is free from hemolytic and cytotoxic properties. These properties are desirable for use in making medical devices.

The resin composition of this invention can be prepared by uniformly melting and kneading the vinyl chloride/ethylene copolymer, the ethylene/carbon monoxide/vinyl acetate copolymer and the glycerin ester by a method known per se. For example, a powder or pellets of the vinyl chloride/ethylene copolymer, a powder or pellets of the ethylene/carbon monoxide/vinyl acetate copolymer, and the glycerin ester are fed into a mixing roll, a Banbury mixer, an extrusion-type keader, etc., and can be uniformly melted and kneaded therein. The melt-kneading temperature is generally 110° to 180° C., preferably 120° to 165° C.

The proportions of the vinyl chloride/ethylene copolymer, the ethylene/carbon monoxide/vinyl acetate copolymer, and the glycerin ester can be varied widely according to the properties required of the final resin composition. Generally, it is preferred to blend the ethylene/carbon monoxide/vinyl acetate copolymer and the glycerin ester in the following propertions per 100 parts by weight of the vinyl chloride/ethylene copolymer.

|  | Blending proportions |
|---|---|
| Ethylene/carbon monoxide/vinyl acetate copolymer | 1 to 180 parts by weight, preferably 5 to 150 parts by weight, more preferably 10 to 130 parts by weight |
| Glycerin ester | 1 to 50 parts by weight, preferably 3 to 30 parts by weight, more preferably 5 to 20 parts by weight |

As required, the resin composition of this invention may further include a stabilizer such as calcium stearate, zinc stearate, calcium oxide or magnesium oxide, an antioxidant such as a phenol compound or a phosphorous acid ester, a plasticizer such as di-2-ethylhexyl phthalate, diethyl hexyl adipate and dioctyl adipate, and a lubricant such as polyethylene, acid amides and esters in amounts which does not substantially affect the desirable properties of the resin composition of this invention adversely. This can lead to an improvement in the heat stability, oxidation resistance, melt flow characteristics during molding, mold adhesion, etc. of the resin composition.

According to a preferred aspect of this invention, the ethylene/carbon monoxide/vinyl acetate copolymer is treated, prior to melt kneading, with a liquid in which the copolymer is substantially insoluble and which substantially dissolves acetic acid.

The term "substantially insoluble" means that the material in question is not soluble at all, or is soluble only slightly. The term "substantially dissolves" means that the liquid dissolves acetic acid even slightly. More specifically, the term "substantially insoluble" means that the solubility at room temperature is less than 10 g/100 ml. The term "substantially dissolves" means that the solubility of acetic acid at room temperature is at least 10 g/100 ml.

This treatment makes it possible to remove at least partly acetic acid which may exist in the ethylene/carbon monoxide/vinyl acetate copolymer and could be a hemolysis- and cytotoxin-causing substance. It is possible therefore to provide a resin composition which has very little hemolytic and cytotoxic properties and is more suitable as a material for medical devices.

Water is suitable as the liquid which can be used in the above treatment. In addition, the following liquids may be used singly or as a mixture of two or more. In this case, when the selected liquid has solubility in the copolymer, it can be used as a mixture with a liquid having no ability to dissolve the copolymer, such as water or methanol.

Alcohols: metanol, ethanol, n-propanol, isopropanol, and butanol.

Ketones: acetone, methyl isobutylketone, and methyl ethyl ketone.

Esters: ethyl acetate and butyl acetate.

Hydrocarbons: butane, pentane, hexane, cyclohexane, benzene, xylene and toluene.

Halogenated hydrocarbons: vinyl chloride, Freon, chloroform, carbon tetrachloride, trichloroethylene.

Other liquids: dioxane, dimethylformamide, and Cellosolve.

Preferably, the treatment of the copolymer with the above liquid is effected by dipping the copolymer, either as granules or in the pulverized state, in the liquid. The ratio of the copolymer to the liquid in this case is generally within the range of between 1:1 and 1:20. Preferably, the temperature at which the copolymer is treated with the liquid is adjusted to temperatures lower than the melting point of the copolymer, preferably temperatures between room temperature and about 50° C. The suitable contact time is several minutes to several hours depending upon the temperature, etc.

As a result of contacting the copolymer with the liquid, acetic acid present in the copolymer dissolves in the liquid, and consequently, the copolymer does not show hemolytic and cytotoxic properties.

Whether acetic acid is fully dissolved is determined by actually molding the resulting resin composition and preforming a hemolysis test and a cytotoxin test on the resulting molded article. As a rough measure, the pH of the washing liquid is measured, and its correlation with the hemolysis test and the cytotoxin test is determined. Hence, rough estimation can be made from the pH value of the washing liquid.

The resin composition provided by this invention consists essentially of the vinyl chloride/ethylene copolymer, the ethylene/carbon monoxide/vinyl acetate copolymer, and the glycerin ester represented by the above chemical formula. Since it has excellent pliability, transparency and antiblocking property and is substantially free from hemolytic and cytotoxic properties, it is very suitable as a material for producing medical devices.

The resin composition of this invention can be suitably used by molding it into medical devices, such as catheters, tubes for transfusion, blood bags, transfusion fluid bags, and blood circuit tubes in artificial dialysis. Depending upon the type of the desired medical device, the resin composition of this invention is molded into any desired shapes such as a film, sheet, plate, container, tube, hollow cylinder, rod and bag. The molding can be performed by usual molding means such as extrusion molding, injection molding, casting, press forming and blow molding.

Preferably, the molding temperature is generally about 110° to 180° C. Especially preferably, the molding is carried out at a temperature of 110° to 160° C. in order to inhibit the heat decomposition of the vinyl chloride/ethylene copolymer and the ethylene/carbon monoxide/vinyl acetate copolymer.

The molded article so obtained, either as such or after being further processed, can be conveniently used as medical devices such as catheters, transfusion tubes, blood bags, transfusion fluid bags, and blood circuit tubes in artificial dialysis.

The following examples illustrate the present invention more specifically.

In these examples, the hemolysis test and the cytotoxin test were carried out as follows:

Hemolysis test

In accordance with a testing method for plastic containers for transfusion fluids described in the "General Testing Methods" in Japanese Pharmacopoeia.

Cytotoxin test

A plastic to be tested was finely cut, and one gram of the cut plastic was added to MEM medium [Eagle-Minimum Essential Medium with Earle's Salt (a tissue culture medium suggested by Eagle)], and extracted in an autoclave at 121° C. for 20 minutes. The extracted culture medium was diluted with a control culture medium, and cells are introduced into it and cultivated at 37° C. for 5 days while maintaining the concentration of $CO_2$ at 5%. The number of cells and the number of dead cells were counted five days later by using a microscope. The results were compared with those obtained with a control liquid, and the toxicity was evaluated.

EXAMPLES 1 TO 4

Vinyl chloride and ethylene were copolymerized at a temperature of 40° C. using diisopropyl peroxydicarbonate as a polymerization catalyst and partially saponified polyvinyl alcohol as a polymerization dispersing agent. By varying the amount of the ethylene monomer, vinyl chloride/ethylene copolymers having different ethylene contents and molecular weight distributions as shown in Table I were obtained. These copolymer had an average degree of polymerization of 1,000.

One hundred parts by weight of a powdery ethylene/vinyl acetate/carbon monoxide copolymer (ethylene content 65% by weight; vinyl acetate content 25% by weight; carbon monoxide content 10% by weight; molecular weight 250,000; acetic acid content 100 ppm) and 300 parts by weight of water were stirred at room temperature for 60 minutes in a receptacle equipped with a stirrer. The mixture was dehydrated and dried, and then tested in accordance with Testing Method for Plastic Containers for transfusion fluids. It was found to have a pH value of 5.5 and an acetic acid content of less than 30 ppm. The amount of materials dissolved in water during the above washing was 0.1% by weight based on the copolymer.

A composition composed of 90 parts by weight of the copolymer pre-treated as above, 100 parts by weight of the vinyl chloride/ethylene copolymer, 7 parts by weight of a liquid product having an oxirane oxygen content of 7% by weight and an iodine value of 2 and prepared by epoxidizing a triglyceride resulting from the esterification of glycerin with a mixture consisting of 50% by weight of 9,12-octadecadienic acid, 45% by weight of 9-octadecenoic acid and 5% by weight of 9,12,15-octadecatrienoic acid, and 0.5 part by weight of a lubricant of the oxidized polyethylene type was kneaded on a two-roll mill at 140° C. for 3 minutes to form a roll sheet. The roll sheet was pelletized by a pelletizer to form cubic pellets.

The cubic pellets were extruded by a 30 mm single-screw extruder (L/D=20; compression ratio=3.0) to form a sheet-like extrudate. The temperature of the resin at the die section during the extrusion was 160° C.

The properties of the resulting extruded sheets are shown in Table I under the headlines "Properties of the composition" and "Acceptability as material for medical devices".

EXAMPLES 5 TO 8

Vinyl chloride and ethylene were copolymerized at 30° C. using cumyl peroxyneodecanoate and sodium bisulfite as a polymerization catalyst and partially saponified polyvinyl alcohol as a dispersing agent. By varying the amount of the ethylene monomer, the copolymers shown in Table I were obtained. These copolymers had an average degree of polymerization of 2,200.

One hundred parts by weight of a powdery ethylene/vinyl acetate/carbon monoxide copolymer (ethylene content 60% by weight; vinyl acetate content 30% by weight; carbon monoxide content 10% by weight; molecular weight 280,000) and 200 parts by weight of methanol were stirred in a receptacle equipped with a stirrer at room temperature for 60 minutes, and dried. The product was tested in accordance with Testing Method for Plastic Containers for Transfusion Fluids. It was found to have a pH of 6.0 (acetic acid content less than 30 ppm), and the amount of materials dissolved in methanol was 10% by weight based on the copolymer.

A composition composed of 90 parts by weight of the copolymer pre-treated as above, 100 parts by weight of the vinyl chloride/ethylene copolymer, and 10 parts by weight of a liquid product having an oxirane oxygen content of 9% by weight and an iodine value of 4 and prepared by epoxidizing a triglyceride resulting from the esterification of glycerin with a mixture consisting of 47% by weight of 9-octadecenoic acid, 25% by weight of 9,12-octadecadienic acid and 28% by weight of 9,12,15-octadecatrienoic acid was well kneaded on a two-roll mill at 150° C., and molded into a sheet having a thickness of 0.4 mm by an inverted L-shaped calender roll.

The properties of the resulting extruded sheets are shown in Table I.

Each of the sheets was transparent and pliable, does not show hemolytic and cytotoxic actions, and scarcely contained materials which dissolved. Thus, it meets the requirements stipulated in the standards for blood-contacting medical devices. Accordingly, it was suitable for making blood bags.

EXAMPLES 9 TO 12

Vinyl chloride and ethylene were copolymerized at 25° C. using diisobutyryl peroxide as a polymerization catalyst and hydroxypropyl methyl cellulose as a dispersing agent. The copolymers shown in Table I were obtained. These copolymers had an average degree of polymerization of 2,800.

One hundred parts by weight of a powdery ethylene/vinyl acetate/carbon monoxide copolymer (ethylene content 65% by weight; vinyl acetate content 25% by weight, carbon monoxide content 10% by weight; molecular weight 300,000; acetic acid content 100 ppm) and a mixed liquid of 200 parts by weight of water and 10 parts by weight of acetone were stirred in a receptacle equipped with a stirrer at 25° C. for 60 minutes. The mixture was dried, and tested in accordance with Testing Method for Plastic Containers for Transfusion Fluids, and found to have a pH of 6.1 and an acetic acid content of less than 30 ppm. The amount of materials which dissolved was 0.8% based on the weight of the copolymer.

A composition composed of 90 parts by weight of the copolymer pre-treated as above, 100 parts by weight of the vinyl chloride/ethylene copolymer, and 15 parts by weight of a liquid product having an oxirane oxygen content of 6% by weight and an iodine value of 1.5 and prepared by epoxidizing a triglyceride resulting from the estrification of glycerin with a mixture consisting of 60% by weight of 9-octadecenoic acid, 20% by weight of erucic acid (cis-13-docosenoic acid) and 20% by weight of 9,12-octadecenoic acid was extrusion-molded under the same conditions as in Example 1.

The properties of the extruded sheets are shown in Table I.

COMPARATIVE EXAMPLES 1 TO 4

For comparison with Examples 1 to 4, extruded sheets were formed under the same conditions as in Examples 1 to 4 except that vinyl chloride/ethylene copolymers having the ethylene contents, average degrees of polymerization and the $\overline{M}w/\overline{M}n$ ratios shown in Table II were used. The properties of the compositions and the acceptability of the extruded sheets as a material for medical devices were evaluated in the same way as in Examples 1 to 4. The results are shown in Table II.

COMPARATIVE EXAMPLES 5 TO 9

For comparison with Examples 5 to 8, extruded sheets were formed under the same conditions as in Examples 5 to 8 except that vinyl chloride/ethylene copolymers having the ethylene contents, average degrees of polymerization and the $\overline{M}w/\overline{M}n$ ratios shown in Table II were used. The properties of the compositions and the acceptability of the extruded sheets as a material for medical devices were evaluated in the same way as in Examples 5 to 8. The results are shown in Table II.

COMPARATIVE EXAMPLES 10 TO 14

For comparison with Examples 9 to 13, extruded sheets were formed under the same conditions as in Examples 9 to 13 except that vinyl chloride/ethylene copolymers having the ethylene contents, average degrees of polymerization and the $\overline{M}w/\overline{M}n$ ratios shown in Table II were used. The properties of the compositions and the acceptability of the extruded sheets as a material for medical devices were evaluated in the same way as in Examples 9 to 13. The results are shown in Table II.

COMPARATIVE EXAMPLES 15 AND 16

The vinyl chloride/ethylene copolymers shown in Table III were produced, and molded into extruded sheets under the conditions shown in Table III. The acceptability of these sheets as a material for medical devices was evaluated, and the results shown in Table III were obtained.

COMPARATIVE EXAMPLE 17

For comparison with Examples 1 to 4, a sheetlike molded article was produced in the same way as in Example 1 except that the same ethylene/vinyl acetate/carbon monoxide copolymer as in Example 1 was used except that it was not washed with water. This sheetlike molded article had excellent transparency and pliability, but showed strong hemolytic activity and was cytotoxic. It had poor antiblocking property.

TABLE I

| | Example | | | | | |
|---|---|---|---|---|---|---|
| | 1 | 2 | 3 | 4 | 5 | 6 |
| Weight ratio of the vinyl chloride/ethylene | 100:90 | 100:90 | 100:90 | 100:90 | 100:90 | 100:90 |

TABLE I-continued

| | | 1 | 2 | 3 | 4 | 5 | 6 |
|---|---|---|---|---|---|---|---|
| copolymer to the ethylene/vinyl acetate/carbon monoxide copolymer | | | | | | | |
| Vinyl chloride/ethylene copolymer | Ethylene content (% by weight) | 4 | 7 | 8 | 8 | 4 | 6 |
| | Average degree of polymerization | 1000 | 1000 | 1000 | 1000 | 2200 | 2200 |
| | Mw/Mn | 4.7 | 3.5 | 5.0 | 5.8 | 4.5 | 5.0 |
| Properties of the composition | Shore hardness A (20° C.) | 88 | 86 | 84 | 84 | 88 | 87 |
| | Tensile strength (ASTM D412, 20° C.; kg/cm$^2$) | 141 | 145 | 144 | 144 | 155 | 153 |
| | Transparency | Good | Good | Good | Good | Good | Good |
| | Fish eyes | Scarcely existent | Scarcely existent | Scarcely existent | Scarcely existent | Scarcely existent | Scarcely existent |
| Acceptability as a material for medical devices | Acceptabiltiy for sterilization with high-pressure steam | Yes | Yes | Yes | Yes | Yes | Yes |
| | Hemolytic activity | Yes | Yes | Yes | Yes | Yes | Yes |
| | Cytotoxic activity | Yes | Yes | Yes | Yes | Yes | Yes |

| | | Example | | | | | |
|---|---|---|---|---|---|---|---|
| | | 7 | 8 | 9 | 10 | 11 | 12 |
| Weight ratio of the vinyl chloride/ethylene copolymer to the ethylene/vinyl acetate/carbon monoxide copolymer | | 100:90 | 100:90 | 100:90 | 100:90 | 100:90 | 100:90 |
| Vinyl chloride ethylene copolymer | Ethylene content (% by weight) | 8 | 12 | 4 | 4.5 | 7 | 11 |
| | Average degree of polymerization | 2200 | 2200 | 2800 | 2800 | 2800 | 2800 |
| | Mw/Mn | 5.0 | 4.5 | 4.0 | 5.0 | 5.3 | 4.5 |
| Properties of the composition | Shore hardness A (20° C.) | 86 | 84 | 88 | 87 | 86 | 84 |
| | Tensile strength (ASTM D412, 20° C.; kg/cm$^2$) | 152 | 150 | 172 | 173 | 179 | 165 |
| | Transparency | Good | Good | Good | Good | Good | Good |
| | Fish eyes | Scarcely existent | Scarcely existent | Scarcely existent | Scarcely existent | Scarcely existent | Scarcely existent |
| Acceptability as a material for medical devices | Acceptability for sterilization with high-pressure steam | Yes | Yes | Yes | Yes | Yes | Yes |
| | Hemolytic activity | Yes | Yes | Yes | Yes | Yes | Yes |
| | Cytotoxic activity | Yes | Yes | Yes | Yes | Yes | Yes |

TABLE II

| | | Comparative Example | | | | | | |
|---|---|---|---|---|---|---|---|---|
| | | 1 | 2 | 3 | 4 | 5 | 6 | 7 |
| Weight ratio of the vinyl chloride/ethylene copolymer to the ethylene/vinyl acetate/carbon monoxide copolymer | | 100:90 | 100:90 | 100:90 | 100:90 | 100:90 | 100:90 | 100:90 |
| Vinyl chloride/ethylene copolymer | Ethylene content (% by weight) | 1 | 2 | 4 | 11 | 2 | 2 | 3.5 |
| | Average degree of polymerization | 1000 | 1000 | 1000 | 1000 | 2200 | 2200 | 2200 |
| | Mw/Mn | 3.1 | 4.8 | 2.2 | 2.1 | 3.6 | 4.0 | 2.2 |
| Properties of the composition | Shore hardness A (20° C.) | 92 | 92 | 89 | 83 | 93 | 92 | 90 |
| | Tensile strength (ASTM D412, 20° C.; kg/cm$^2$) | 140 | 140 | 137 | 140 | 153 | 151 | 148 |
| | Transparency | Poor | Poor | Poor | Poor | Poor | Poor | Poor |
| | Fish eyes | Many | Slightly many | Many | Many | Many | Many | Many |
| Acceptability as a material for medical devices | Acceptability for sterilized with high-pressure steam | No | No | No | No | No | No | No |
| | Hemolytic activity | Yes | Yes | Yes | Yes | No | Yes | Yes |
| | Cytotoxic activity | Yes | Yes | Yes | Yes | Yes | Yes | Yes |

| | | Comparative Example | | | | | | |
|---|---|---|---|---|---|---|---|---|
| | | 8 | 9 | 10 | 11 | 12 | 13 | 14 |
| Weight ratio of the vinyl chloride/ethylene copolymer to the ethylene/vinyl acetate/carbon monoxide copolymer | | 100:90 | 100:90 | 100:90 | 100:90 | 100:90 | 100:90 | 100:90 |
| Vinyl chloride/ethylene copolymer | Ethylene content (% by weight) | 8 | 11 | 2 | 2 | 3 | 7.3 | 8 |
| | Average degree of polymerization | 2200 | 2200 | 2800 | 2800 | 2800 | 2800 | 2800 |
| | Mw/Mn | 5.7 | 2.0 | 3.0 | 4.1 | 5.0 | 5.9 | 2.0 |

TABLE II-continued

| Properties of the composition | Shore hardness A (20° C.) | 86 | 84 | 93 | 93 | 92 | 85 | 85 |
|---|---|---|---|---|---|---|---|---|
| | Tensile strength (ASTM D412, 20° C. kg/cm²) | 152 | 148 | 170 | 169 | 170 | 171 | 168 |
| | Transparency | Good | Poor | Poor | Poor | Poor | Good | Poor |
| | Fish eyes | Many | Many | Many | Many | Many | Slightly many | Many |
| Acceptability as a material for medical devices | Acceptability for sterilization with high-pressure steam | No | No | No | No | No | No | No |
| | Hemolytic activity | Yes | Yes | No | No | Yes | Yes | No |
| | Cytotoxic activity | Yes | Yes | No | Yes | Yes | Yes | Yes |

TABLE III

| | Comparative Example | |
|---|---|---|
| | 15 | 16 |
| Ratio of the vinyl chloride/ethylene copolymer to the ethylene/vinyl acetate/carbon monoxide copolymer | 100:80 | 100:95 |
| Vinyl chloride/ethylene copolymer — Ethylene content (wt. %) | 4 | 6 |
| Average degree of polymerization | 550 | 3,500 |
| Mw/Mn | 3.5 | 4.8 |
| Molding and processing conditions for sheet preparation — Conditions for preparation of a compound (roll kneading temperature and time) | 135° C., 5 min. | 170° C., 5 min. |
| Extrusion molding conditions (resin temperature) | 160° C. | 160° C. |
| Acceptability as a medical device — Transparency and fish eyes | Poor | Poor |
| Acceptability for sterilization with high-pressure steam (121° C., 30 min.) | No | No |
| Hemolytic property | Unacceptable | Unacceptable |
| Cytotoxic property | Unacceptable | Unacceptable |

What we claim is:

1. A resin composition comprising the following blend:
   (a) a vinyl chloride/ethylene copolymer having an ethylene content in the range of 3 to 12% by weight, an average degree of polymerization in the range of 700 to 2900 and a ratio of weight average molecular weight to number average molecular weight in the range of from 2.5:1 to 5.5:1,
   (b) an ethylene/carbon monoxide/vinyl acetate copolymer, and
   (c) a glycerin ester of the following formula

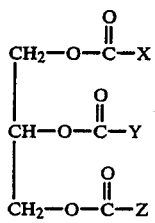

wherein X, Y and Z are identical or different and each represents a hydrogen atom or a residue of an epoxidized aliphatic carboxylic acid selected from the class consisting of

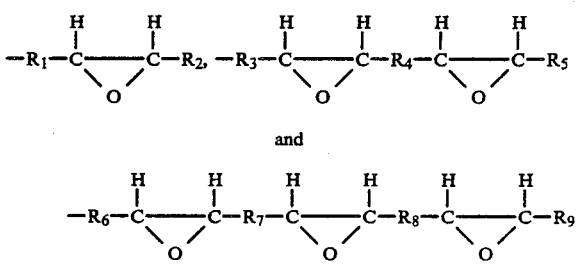

and

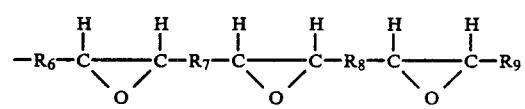

in which $R_1$, $R_3$, $R_4$, $R_6$, $R_7$ and $R_8$, independently from each other, represent a saturated or unsaturated, linear or branched divalent hydrocarbon group having 1 to 25 carbon atoms, and $R_2$, $R_5$ and $R_9$, independently from each other, represent a saturated or unsaturated, linear or branched monovalent hydrocarbon group having 1 to 25 carbon atoms, provided that X, Y and Z are not hydrogen atoms at the same time;

said composition being such that before blending the ingredients of the resin composition, the ethylene/carbon monoxide/vinyl acetate copolymer is treated with a liquid which substantially dissolves acetic acid and in which the copolymer is substantially insoluble and the thus-treated copolymer is dried.

2. The resin composition of claim 1 wherein the vinyl chloride/ethylene copolymer has an ethylene content of 5 to 10% by weight.

3. The resin composition of claim 1 wherein the vinyl chloride/ethylene copolymer has an average degree of polymerization in the range of 1,000 to 2,500 and a ratio of weight average molecular weight to number average molecular weight in the range of from 2.3:1 to 5.2:1.

4. The resin composition of claim 1 wherein the ethylene/carbon monoxide/vinyl acetate copolymer is a copolymer produced by copolymerizing 1 part by weight of ethylene, 0.03 to 0.5 part by weight of carbon monoxide and 0.1 to 0.9 part by weight of vinyl acetate in the presence of a radical polymerization catalyst.

5. The resin composition of claim 1 wherein the ethylene/carbon monoxide/vinyl acetate copolymer has a weight average molecular weight in the range of about 100,000 to about 2,000,000.

6. The resin composition of claim 1 wherein the glycerin ester has an oxirane oxygen content of 5 to 10% by weight.

7. The resin composition of claim 1 wherein the glycerin ester has an iodine value of not more than 10.

8. The resin composition of claim 1 wherein the glycerin ester is selected from the group consisting of a triglyceride of 9-octadecenoic acid, 9,12-octadecadienic acid and 9,12,15-octadecatrienoic acid, a triglyceride of 13-docosenoic acid, 9-octadecenoic acid and 9,12,15-octadecatrienoic acid, a triglyceride of 9-octadecenoic acid and 9,12-octadecadienoic acid, a triglyceride of 9-octadecanoic acid and 9,12-octadecadienic acid, and a triglyceride of 9-octadecenoic acid and 9,12,15-octadecatrienoic acid.

9. The resin composition of claim 1 wherein said liquid is water.

10. The resin composition of claim 1 comprising
  (a) 100 parts by weight of the vinyl chloride/ethylene copolymer,
  (b) 1 to 180 parts by weight of the ethylene/carbon monoxide/vinyl acetate copolymer, and
  (c) 1 to 50 parts by weight of the glycerin ester of formula (I).

11. The resin composition of claim 10 comprising
  (a) 100 parts by weight of the vinylchloride/ethylene copolymer,
  (b) 10 to 130 parts by weight of the ethylene/carbon monoxide/vinyl acetate copolymer, and
  (c) 5 to 20 parts by weight of the glycerin ester of formula (I).

12. A process for preparing the resin composition of any one of claims 1 to 12, which comprises kneading in the molten state (a) the vinyl chloride/ethylene copolymer, (b) the ethylene/carbon monoxide/vinyl acetate copolymer and (c) the glycerin ester of formula (I) at a temperature of 110° to 180° C.

13. A medical device formed of the resin composition of any one of claims 1 to 12.

14. The medical device of claim 13 which is in the form of a catheter, a blood transfusion tube, a fluid transfusion tube, a blood bag, a transfusion fluid bag, or a blood circuit tube.

* * * * *